United States Patent
Saito et al.

(10) Patent No.: US 7,436,529 B2
(45) Date of Patent: Oct. 14, 2008

(54) RECORDING CONTROL APPARATUS AND CONTROL METHOD USING THE SAME RECORDING CONTROL APPARATUS

(75) Inventors: Hitoshi Saito, Kanagawa (JP); Akira Morisawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1323 days.

(21) Appl. No.: 10/406,194

(22) Filed: Apr. 4, 2003

(65) Prior Publication Data
US 2003/0189719 A1    Oct. 9, 2003

(30) Foreign Application Priority Data
Apr. 9, 2002 (JP) ............... 2002-106505
Apr. 9, 2002 (JP) ............... 2002-106506

(51) Int. Cl.
*G06F 15/00* (2006.01)
*G06F 15/16* (2006.01)

(52) U.S. Cl. .................. 358/1.14; 709/219

(58) Field of Classification Search ............... 358/1.15, 358/1.14, 403, 402, 1.13, 474; 709/219, 709/225; 713/156, 182; 710/5, 58, 313
See application file for complete search history.

(56) References Cited

U.S. PATENT DOCUMENTS

| | | | |
|---|---|---|---|
| 4,864,417 A | 9/1989 | Watanabe et al. ........... 358/296 |
| 5,799,206 A | 8/1998 | Kitagawa et al. ............ 395/856 |
| 5,918,006 A | 6/1999 | Saito et al. ............. 395/185.07 |
| 6,711,626 B1 * | 3/2004 | Okada ........................... 710/5 |

FOREIGN PATENT DOCUMENTS

| | | |
|---|---|---|
| DE | 198 57 332 | 6/2000 |
| GB | 2 350 536 | 11/2000 |
| JP | 05-088820 | 4/1993 |
| JP | 07-288625 | 10/1995 |
| JP | 8-181801 | 7/1999 |
| JP | 11-177786 | 7/1999 |
| JP | 11-316667 | 11/1999 |
| JP | 2000-215144 | 8/2000 |
| JP | 2000-231458 | 8/2000 |
| JP | 2002-79726 | 3/2002 |

* cited by examiner

*Primary Examiner*—Saeid Ebrahimi Dehkordy
(74) *Attorney, Agent, or Firm*—Fitzpatrick, Cella, Harper & Scinto

(57) ABSTRACT

The present invention, which includes a USB interface for receiving recording data from an external processor by using a first logical channel of multiple logical channels thereof, a recording unit for recording an image on the basis of recording data, and the USB interface for connecting with the recording unit, transfers recording data to the recoding unit via the USB interface and causes the recording unit to record, while forbidding to receive the recording data from the external processor via the USB interface during a recording operation of the recording unit.

7 Claims, 8 Drawing Sheets

RECORDING CONTROL APPARATUS AND CONTROL METHOD USING THE SAME RECORDING CONTROL APPARATUS

FIELD OF THE INVENTION

The present invention relates to a recornding (printing) control apparatus for controlling a recording process in a recording unit and a method for controlling by using the control apparatus.

BACKGROUND OF THE INVENTION

One of known facsimiles connectable to an information-processing terminal such as a personal computer is disclosed, for example in, Japanese Patent Laid-Open No. 7-288625 which can be connected to an information-processing terminal (a computer device) via bi-directional parallel port such as one from Centronics Data Computer Inc. (IEEE 1284 compliant), or via Universal Serial Bus (USB). In image processing systems having a facsimile and an information-processing terminal that are interconnected using such a scheme, the interconnection is provided only by a mechanism in which a single logical interface is provided on a single physical. Because of this, when using such a information-processing terminal to control a multifunction facsimile having functions such as a printer, a scanner, or a facsimile, the functions of the facsimile cannot operate in parallel, resulting in incomplete uses of the advantages of the multifunction facsimile. In order to force the multifunction facsimile perform multiple functions in parallel, operations described below have to be taken.

Specifically, in the information-processing terminal, header information that identifies each of functions such a printer, a scanner, or a facsimile has to be added to the top of a control command, the command has to be edited and then packetized, and finally the packetized data has to be sent to the multifunction facsimile to designate each of the functions. This leads a big problem in that it requires an effort to rebuild a driver to be installed in the information-processing terminal, that the control operation is complicated, and that throughput is low.

Moreover, in the case of a multifunction facsimile that receives packetized data from an information-processing terminal, analysis of the packetized data is required to determine which the data is to be processed with among a printer and a scanner, or whether the data is for facsimile communication. Furthermore, it is also required that, after a function to be operated is determined on the basis of header information on the top of a control command, the header information be deleted or edited. This caused another big problem of complicated control and low throughput.

Recently, a technique for easily achieving parallel operations of functions such as a printer, a scanner, a digital camera, or a facsimile has been proposed which employs a USB for a physical interface between an information-processing terminal and a facsimile to form multiple logical channels defined by the USB standards (USB composite device). In this case, simpler control and higher throughput can be expected since multiple logical channels corresponding to respective functions are provided; thereby eliminating the requirement that header information for identifying each function be added to a control command.

However, another problem occurs when employing the USB for the physical interface between the information-processing terminal and the facsimile to form multiple logical channels defined by the USB standards. Specifically, in the case of a multifunction facsimile having only a conventional single logical interface, an information-processing terminal adds to the top of an original control command, header information identifying each function such as a printer, a scanner, or a facsimile, and edits and then packetizes the command, and finally sends the packetized data to the multifunction facsimile. Therefore, the multifunction facsimile with a single logical interface does not start operation until it has analyzed the packetized data to determine which the data received from the information-processing terminal is related to among a printer, a scanner, and a facsimile communication. Thus, a main control unit in a multifunction facsimile controls all of the operations; this is why there occurs no trouble caused by conflict between operations requiring the same hardware resource.

However, when the above-described multiple logical channels are used, a control command from an information-processing terminal is directly transferred to operation units without the command analyzed by the main control unit in the multifunction facsimile. This allows the operation units in the multifunction facsimile to independently operate according to instructions from the information-processing terminal. Therefore, when an operator of the multifunction facsimile instructs the main control unit to locally perform an operation that requires a hardware resource such as a scanner or a printer, trouble can occur due to conflicts for the hardware resources between instructions from the information-processing terminal. For example, if there are performed in parallel a printing operation caused by an instruction from the information-processing terminal, and a copying operation caused by an instruction from the operator of the multifunction facsimile, their printing processes at printing unit will conflict with each other.

SUMMARY OF THE INVENTION

The present invention is adapted in view of the above-mentioned conventional art. A feature of the present invention is to provide a recording control apparatus and a control method using the control apparatus, in which the recording control apparatus prevents recording data comes from different sources from conflicting at a recording unit by forbidding the recording unit to receive recording data from an external processor, when recording is performed on the basis of data from a data source other than the external processor while the recording unit performs recording control on the basis of data from different data sources including the external processor.

Another purpose of the present invention is to provide a recording control apparatus and a control method using the control apparatus, in which the control apparatus performs an exclusive control of a hardware resource by using a semaphore.

Yet another purpose of the present invention is to provide a recording control apparatus and a control method in the control apparatus, in which the recording control apparatus prevents recording processes to use a recording unit on the basis of data comes from an external processor and recording data comes from other data sources from conflicting by starting a record process with obtaining a recording semaphore, when the recording control apparatus performs a recording control by using a recording unit.

According to the present invention, the foregoing object is attained by providing a recording control apparatus comprising:

first interface means having multiple logical channels, for receiving recording data from an external processor by using a first logical channel among the multiple logical channels;

a recording unit for recording an image on the basis of recording data;

second interface means for connecting with the recoding unit;

first recording control means for transmitting recording data received via the first interface means to the recoding unit via the second interface means and causing the recording unit to record; and second recording control means for transmitting the recording data through the second interface means to the recoding unit and causing the recording unit to record, while forbidding reception of recording data from the external processor by using the first interface means during the recording operation.

Further objects, features and advantages of the present invention will become apparent from the following detailed description of embodiments of the present invention with reference to the accompanying drawings.

DETAILED DESCRIPTION OF THE PREFERRED EMBODIMENTS

Preferred embodiments of the present invention will be described with reference to attached drawings.

Figure 1:
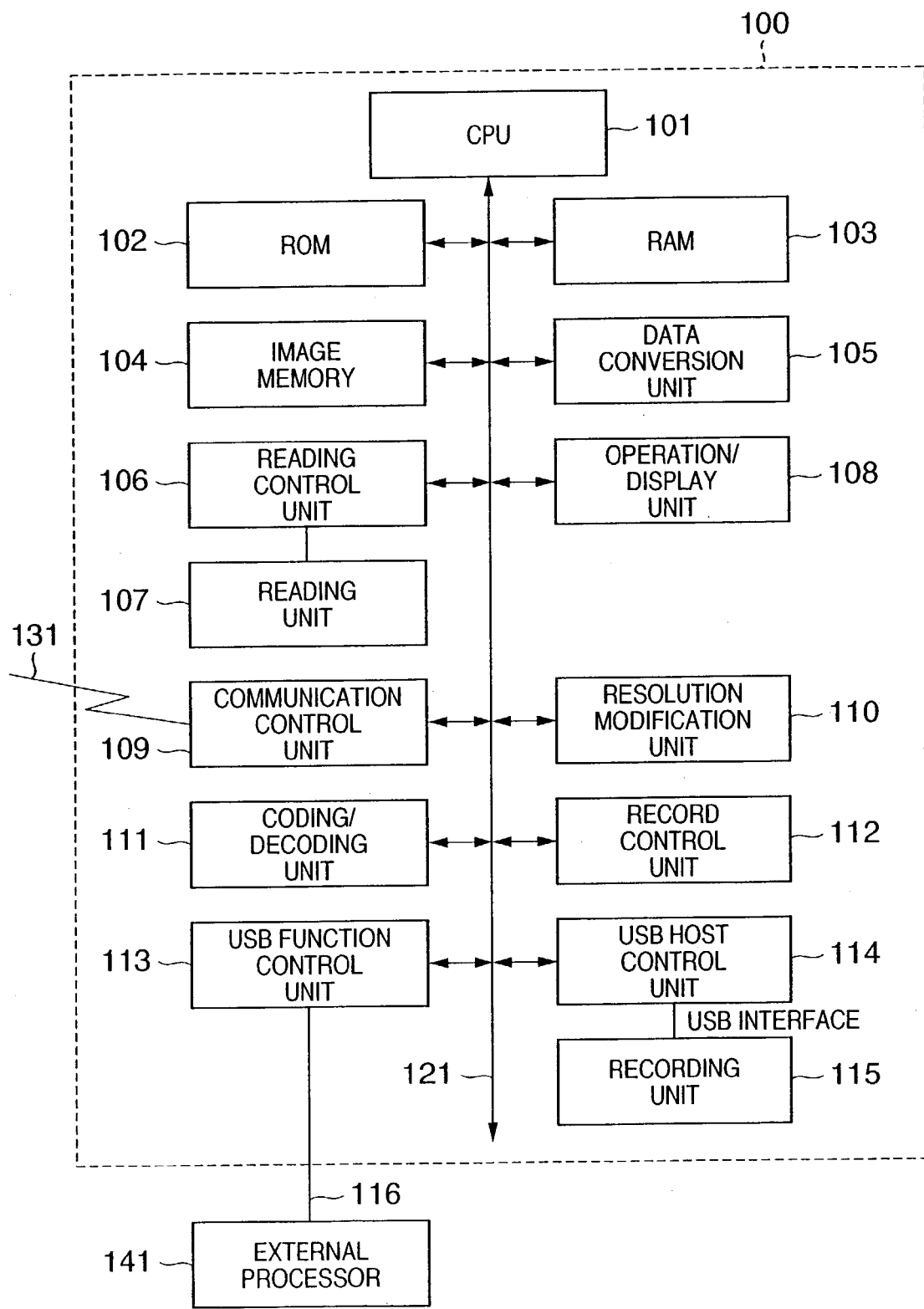
FIG. 1 depicts a block diagram showing a configuration of a multifunction facsimile of a first embodiment according to the present invention.

FIG. 1 is a block diagram showing a brief configuration of a multifunction facsimile 100 as an exemplary print control apparatus of an embodiment according to the present invention. Although this embodiment is described as a multifunction facsimile, the present invention is not limited to the multifunction and any device or system will be included in the scope of the present invention as long as it has a printing unit and performs a printing process by using the printing unit on the basis of recording data, which is generated in the device or system itself, and can also perform recording at the recording unit on the basis of recording data from a computer device by connecting the computer device via an interface.

In FIG. 1, CPU 101 is a main control unit for controlling the entire operation of the facsimile 100 according to a control program recorded in ROM 102. ROM 102 records a control program performed by CPU 101, an embedded operating system (OS) program, and various types of data. In the embodiment, each control program stored in ROM 102 performs each type of controls to be described below, while performing a software control including scheduling or task switch under control of an embedded OS stored in ROM 102. RAM 103, which is composed of SRAM or DRAM and the like, stores a variable for a program control, a setting registered by operating personnel, and management data for this facsimile 100, while it is provided with a working buffer area for storing various types of work data during a control process by CPU 101. Image memory 104, which is composed of DRAM and the like, accumulates image data read by reading unit 107 such as a scanner, for example, or image data received via communication line 131 and the like. Data conversion unit 105 analyzes and expands page description language (PDL) etc. input from an external processor 141 into image data, expands character data into image data, or converts image data. Reading unit 107 optically reads an original copy by using CIS image sensor (contact image sensor) and outputs an image signal converted into electric image data. This converted image signal is inputted to reading control unit 106, where various types of image-processing including binarization and halftoning are performed on the signal and high definition image data is output. In this embodiment, the reading control unit 106 is adapted for the reading unit 107, which supports both of a sheet reading method for reading an original copy while carrying a sheet of the original copy and a book reading method for scanning an original copy set on a document glass.

Operation/display unit 108 includes an operation unit, which includes number keys, character keys, one-touch telephone number keys, a mode-setting key, a decision key, and a cancel key, for operating personnel to decide data on the other party to be sent an image or to register set data. The operation/display unit 108 includes a display unit, which includes various keys, an LED (light emitting diode) and an LCD (liquid crystal display), for displaying various input operations performed by operating personnel, an operating status and status information of the facsimile 100. Communication control unit 109, which includes a modem (modulator/demodulator) and an NCU (network control unit), is connected to an analog communication line (PSTN) 131 and performs a communication control with T30 protocol and a line control on call-out and call-in for a communication line. However, a control by the communication control unit 109 is not limited to control a communication with an analog line. It is matter of course that the communication control unit 109 can include a function of controlling a communication with a digital line. Resolution modification unit 110 can perform not only a control of modification such as resolution modification, which changes a resolution of image data from, for example, dots/mm to dots/inch but also scaling of image data.

Coding/decoding unit 111 performs coding (MH, MR, MMR, JBIG, JPEG, etc.), decoding and scaling of image data to be treated in the facsimile 100. Recording control unit 112 converts image data to be printed at a recording unit 115 such as a printer and the like into high definition image data by performing various kinds of image processing including smoothing or printed-density correction, color correction, etc. by means of an image processing control unit (not shown) and outputs the converted data to a USB host control unit 114 (to be described later). By controlling the USB host control unit 114, the recording control unit 112 regularly obtains operating status data of a recording unit 115. USB function control unit 113 performs communication control of a USB Interface 116 by performing USB packet transmission, in which the unit 113 converts data from a USB control task performed by CPU 101 into a packet and sends the packet to the external processor 141 and, vice versa, receives a USB packet from the external processor 141, converts the packet into data and sends the converted data to the CPU 101 by performing protocol control according to the USB communication standards. USB host control unit 114 is a control unit for communicating according to a protocol stipulated by the USB standards. The USB standards for the USB host control unit 114 allow high-speed bidirectional data communication, in which multiple hubs or functions (slaves) can be connected to a single host (master). The USB host control unit 114 has a function of a host in the USB communication. Recording unit 115, which is a printer such as a laser beam printer or an ink jet printer, prints an image on recording medium on the basis of color image data or monochrome image data. The recording unit 115 and the USB host control unit 114 perform communication according to a protocol complying with the USB standards. The recording unit 115, in particular, has a capability of the USB function (a function to operate as a slave to USB).

In the embodiment, one-to-one connection is adopted for USB communication of recording functions. The above-mentioned components 101-106 and 108-114 are connected each other via a CPU bus 121 controlled by the CPU 101.

Now, configuration of the USB function control unit 113 in the USB interface will be described in detail.

Figure 2:
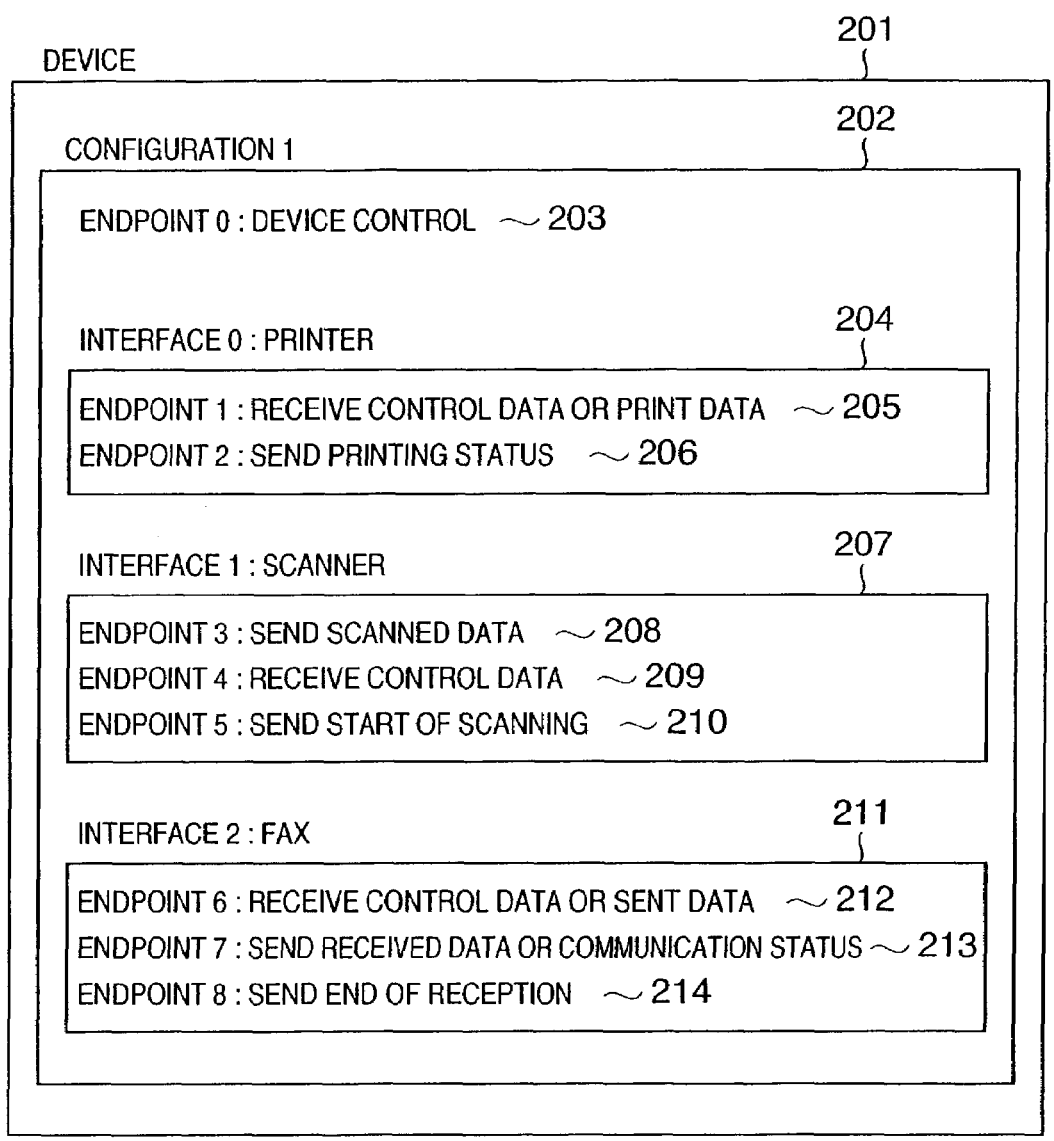
FIG. 2 depicts a conceptual drawing illustrating a USB interface in the multifunction facsimile of the first embodiment according to the present invention.

FIG. 2 is a conceptual drawing illustrating the USB interface to the USB function control unit 113 of the embodiment.

For a device shown with the biggest frame 201, which indicates an attribute of the entire of the apparatus 100, only one device can be defined in the USB standards. An attribute of the device 201 is represented by a device descriptor, which includes a manufacturer ID, a product ID, a release number, and the number of configurations (not shown) for the device. In the embodiment, the number of configurations is "1".

One configuration (Configuration1 (202)) is defined for this device 201. An attribute of this Configuration1 (202) is represented by a configuration descriptor, which includes the number of interfaces of the configuration. In the embodiment, the number of interfaces is "3".

For Configuration1 (202), three interfaces (Interface0-Interface2 (204, 207, 211)) are defined. Each attribute of these three interfaces (Interface0-Interface2 (204, 207, 211)) is represented by an interface descriptor, which includes the number of endpoints and class code for each interface. In the embodiment, Interface0 (204) is for the recording unit 115, with the number of endpoints for Interface0 (204) being "2". Interface1 (207) is for the reading unit 107, with the number of endpoints for Interface1 (207) being "3". Interface2 (211) is used for sending/receiving by the facsimile, and the number of endpoints for Interface2 (211) is "3".

For Interface0 (204) used for the recording unit 115, two endpoints (Endpoint1, Endpoint2 (205, 206)) are defined. Each attribute for two endpoints, Endpoint1 and Endpoint2 (205, 206), is represented by an endpoint descriptor, which includes an endpoint number, a direction of the communication, a type of transfer, and a packet size. Endpoint1 (205) is mainly used for receiving control data and print data sent from the external processor 141 to the recording unit 115. Endpoint2 (206) is mainly used for sending an operating status on the basis of received print data from the recording unit 115 to the external processor 141.

For Interface1 (207) used for the recording unit 107, three endpoints (Endpoint3, Endpoint4, Endpoint5 (208, 209, 210)) are defined. Each attribute for the endpoints, Endpoint3, Endpoint4, Endpoint5 (208, 209, 210) is represented by an endpoint descriptor, which includes an endpoint number, a direction of the communication, a type of transfer, and a packet size. Endpoint3 (208) is mainly used for sending read data from the reading unit 107 to the external processor 141. Endpoint4 (209) is mainly used for receiving control data from the external processor 141. Endpoint5 (210) is mainly used by the reading unit 107 for informing the external processor 141 of the fact that scan starts at the reading unit 107.

For Interface2 (211) used for sending/receiving by the facsimile, three endpoints (Endpoint6, Endpoint7, Endpoint8 (212, 213, 214)) are defined. Each attribute of the endpoints, Endpoint6, Endpoint7, Endpoint8 (212, 213, 214) is represented by an endpoint descriptor, which includes an endpoint number, a direction of the communication, a type of transfer, and a packet size. Endpoint6 (212) is mainly used for receiving control data from the external processor 141 or receiving data sent by the facsimile. Endpoint7 (213) is mainly used for sending data received by facsimile or a communication status of sending/receiving in facsimile to the external processor 141. Furthermore, Endpoint8 (214) is mainly used for informing the external processor 141 of the fact that receiving in facsimile ends.

Now, a configuration of the USB interface to the recording unit 115 will be described in detail.

Figure 3:
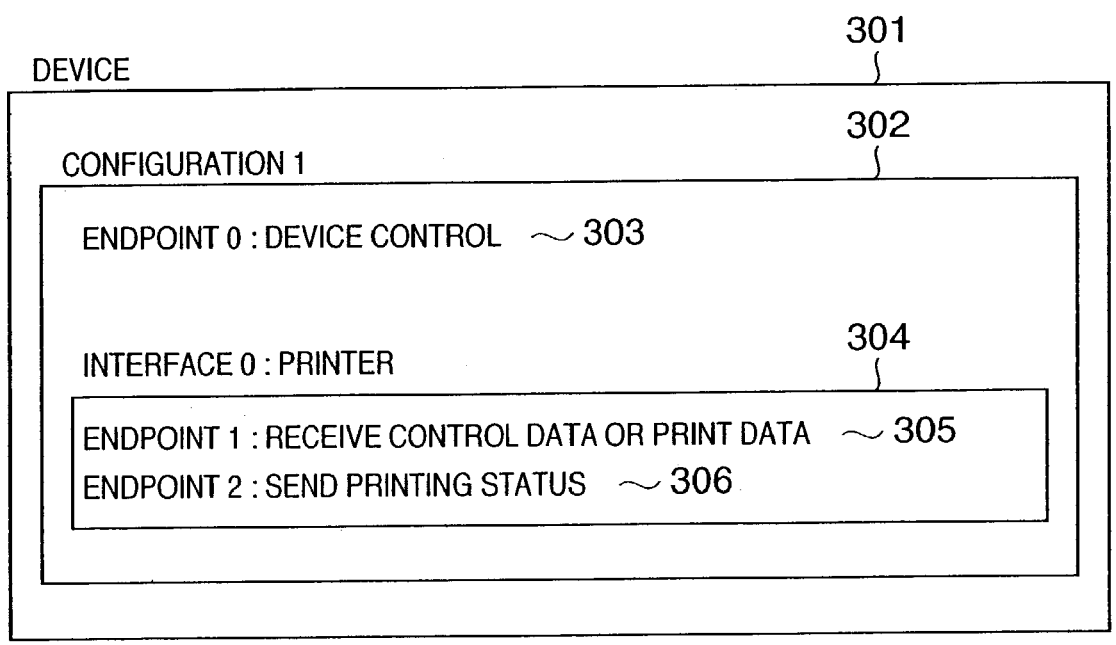
FIG. 3 depicts a conceptual drawing illustrating the USB configuration of a recording unit in the multifunction facsimile of an example according to the present invention.

FIG. 3 is a conceptual drawing illustrating a USB interface to the recording unit 115 in the facsimile 100 of the embodiment.

For a device shown with the biggest frame 301, which indicates an attribute of the entire apparatus 100, only one device can be defined in the USB standards. An attribute of the device 301 is represented by a device descriptor, which includes a manufacturer ID, a product ID, a release number, and the number of configuration (not shown) for the device. In the embodiment, the number of configuration is "1". One configuration (Configuration1 (302)) is defined to this device 301. An attribute of Configuration1 (302) is represented by a configuration descriptor, which includes the number of interfaces in the configuration. In the embodiment, the number of interfaces is "1".

For Configuration1 (302), one interface (Interface0 (304)) is defined. An attribute of this Interface0 (304) is represented by an interface descriptor, which includes the number of endpoints and class code for each interface. In the first embodiment, the number of endpoints in Interface0 (304) used for printing is "2". In Configuration1 (302), Endpoint0 (403) is used for controlling the apparatus 100, serving as a path for sending configuration data of the apparatus. In the facsimile 100, the CPU 101 is also used for sending an operating status of the recording unit 115.

Two endpoints, Endpoint1 and Endpoint2 (305, 306) are defined in Interface0 (304) used for printing. Each attribute for the endpoints, Endpoint1 and Endpoint2 (305, 306) is represented by an endpoint descriptor, which includes an endpoint number of the endpoint, a direction of the communication, a type of transfer, and a packet size. Endpoint1 (305) is mainly used for receiving control data or print data from the CPU 101 or the external processor 141. Endpoint2 (306) is mainly used for sending a printing operation status on the basis of received print data to the CPU 101 or the external processor 141.

Now, a basic operation of the multifunction facsimile 100 including the above-mentioned configuration will be described.

The facsimile 100 is connected with the external processor 141 such as a PC via the USB Interface 116. In the facsimile 100, the USB function unit 113, which has multiple interfaces (Interface0-Interface2 (204, 207, 211)) as shown in FIG. 2, is responsible for communication processing with the external processor 141 (first interface means). Among the multiple interfaces, Interface0 (204) used for the recording unit 115 is a first logical channel, Endpoint1 (205) for receiving control data and print data is a first endpoint, and Endpoint2 (206) for sending an operation status (printing status) is a fourth endpoint.

On the other hand, the recording unit 115 of the facsimile 100 is controlled by the CPU 101 through the USB host control unit 114 and the USB Interface 116 (second interface means).

In the facsimile 100, which has only one interface (Interface0) as shown in FIG. 3, the USB host unit 114 is responsible for communication with the recording unit 115. This only one interface, Interface0 (304) is a second logical channel, Endpoint1 (305) for receiving control data and print data is a second endpoint, and Endpoint2 (306) for sending an operation status (printing status) is a third endpoint.

The CPU 101 in the facsimile 100 transfers control data and print data received from the external processor 141 via Endpoint1 (205) in the USB function control unit 113 to the recording unit 115 via Endpoint1 (305) in the USB host control unit 114. At this moment, no edition is performed on the data to be transferred.

In the same manner, the CPU 101 in the facsimile 100 also transfers an operation status of the recording unit 115 received via Endpoint2 (306) in the USB host control unit 114 to the external processor 141 via Endpoint2 (206) in the USB function control unit 113. At this moment, no edition is performed on data to be transferred, either.

As data is transmitted in a completely transparent manner here, the external processor 141 can freely control the recording unit 115 to perform printing and also be informed with an operation status thereof as if the external processor 141 is directly connected to the recording unit 115.

An operation status (printing status) of the recording unit 115 is obtained by the external processor 141 along the following procedure.

When In-token is given to Endpoint2 (206) of the USB function control unit 113 from the external processor 141, the CPU 101 issues In-token to Endpoint2 (306) of the USB host control unit 114. The recording unit 115 receives this In-token and then sends information on predetermined operation status through Endpoint2 (306) of the USB host control unit 114. The CPU 101 receives the information and transfers information on operation status received from the recording unit 115 through Endpoint2 (206) of the USB function control unit 113 to the external processor 141.

In the above-mentioned configuration, the CPU 101 needs not analyze print data, thus, load of processing is relieved. Any alteration to the recording unit 115 does not affect an operation of the CPU 101, thus, the printer to be used at the recording unit 115 can be freely selected. In the external processor 141, as a basic printer driver can be used as it is, it is advantageous that no effort or load is required for developing or implementing a new driver.

Now, a recording operation of the multifunction facsimile 100 of the first embodiment according to the present invention will be described in detail. In this first embodiment, the CPU 101 of the facsimile 100 also uses Endpoint2 (306) used for obtaining an operation status for the external processor 141.

Figure 4:
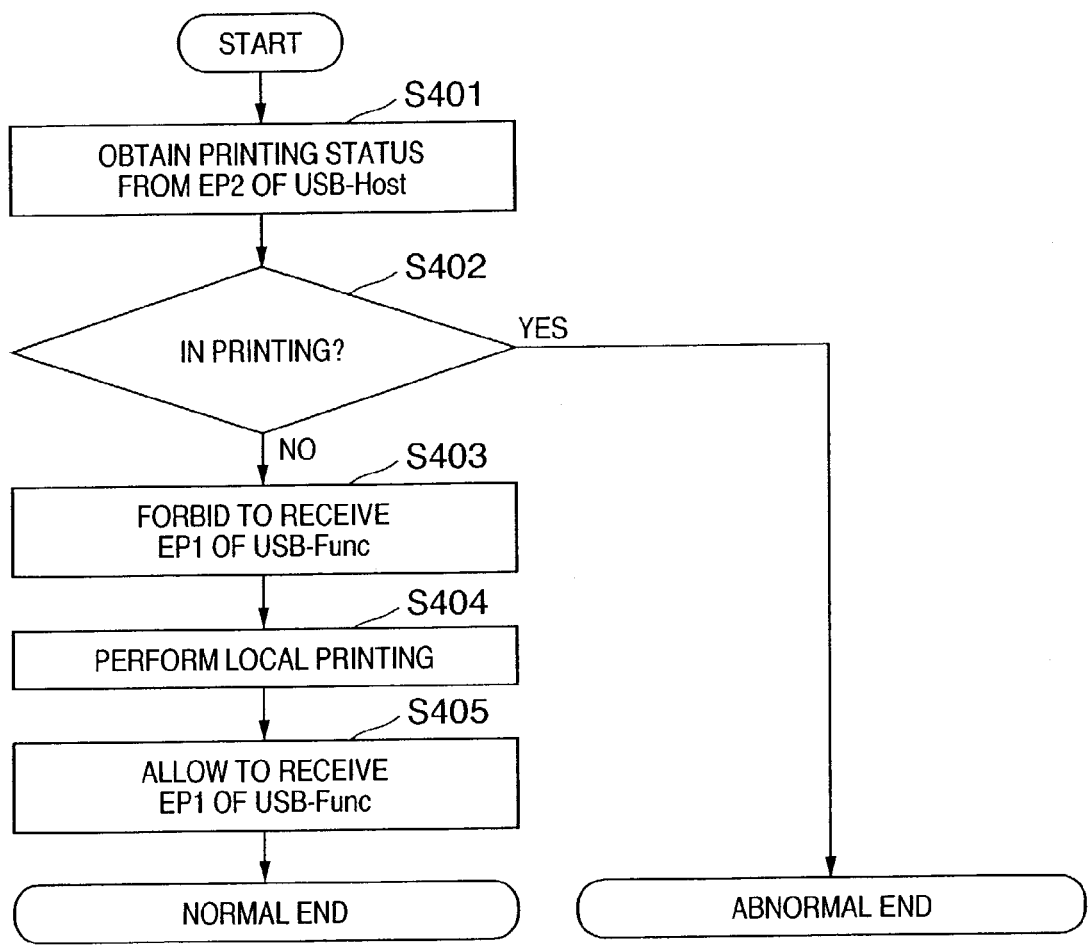
FIG. 4 is a flowchart showing a local recording with the multifunction facsimile of the first embodiment according to the present invention.

FIG. 4 is a flowchart for showing a process for local recording such as copying, outputting a report, or recording a received image at the multifunction facsimile of the first embodiment according the present invention. A program for performing this process is stored in the ROM 102 and executed under a control of the CPU 101.

When the facsimile 100 starts a recording process locally, the CPU 101 obtains information on an operation status (operation status information) of the recording unit 115 via Endpoint2 (306) of the USB host control unit 114 at step S401 at first. This obtained operation status is stored in the RAM 103. The CPU 101 obtains information on this operation status by issuing In-token to Endpoint2 (306) of the USB host control unit 114 as mentioned above. The recording unit 115 receives this In-token and then sends operation status information at the moment to the CPU 101 via Endpoint2 (306).

Then, the process proceeds to step S402, where the operation status information obtained and stored in the RAM 103 is searched for and determined whether the recording unit 115 is in the process of printing. The operation status information includes an operation status, a busy status, a warning status, an operator-call status, and a service-call status in the recording unit 115. The status information is described by several characters of ASCII code in the first embodiment like "DJS (operation status)", "DBS (busy status)", "DWS (warning status)", "DOC (operator-call status)", "DSC (service-call status)", respectively. The operation status information is easily searched for, for a format of an operation status information returned from the recording unit 115 is "command: status code", which are all described in ASCII code. The recording unit 115 can be determined whether it is in the process of printing or not by reading a status code following DJS (operation status).

When it is determined that the recording unit 115 is in the process of printing at step S402, it means that recording directed from the external processor 141 is performed. Then, the process abnormally ends without starting local recording.

When it is determined that the recording unit 115 is not in the process of printing at step S402, the process proceeds to step S403 to start local recording. At first, the USB function control unit 113 is set to forbid reception of Endpoint1 (205), which is used for receiving control data and print data from the external processor 141. The USB function control unit 113 has multiple endpoints as shown in FIG. 2. Each of the endpoints can be independently set for availability of sending and receiving. Each endpoint has corresponding sending/receiving buffer (not shown); when receiving is allowed, received data is automatically stored into the buffer, while receiving is forbidden, received data is not stored into the buffer, and NAK (negative acknowledge) is returned to a host (here the external processor 141) at the end of packet transferring. The setting that forbids reception can prevent an instruction of the external processor 141 from being transferred to the recording unit 115 during a process of local recording at the facsimile 100.

Next, the process proceeds to step S404, where local recording such as copying, outputting a report, or recording a received image is performed. The CPU 101 performs this local recording by transmitting control data and print data to the recording unit 115 via Endpoint1 (305) of the USB host control unit 114.

When all the recording data is output to the recording unit 115 and this local recording ends, the process proceeds to step S405, where the setting that forbids reception of Endpoint1 (205) of the USB function-control unit 113 is reset and the process normally ends.

A flowchart for showing a control process for the multifunction facsimile of the first embodiment according to the present invention to locally perform recording has been described.

As mentioned above, according to the first embodiment, when a recording (printing) process is performed by the recording unit 115 in the facsimile 100, control data and recording data from the external processor 141, such as a computer device, connected via a the USB Interface 116 can be forbidden, thus, conflict of local recording data with recording data from the external processor at the recording unit 115 can be avoided.

Second Embodiment

Now, a recording operation in a facsimile of a second embodiment according to the present invention will be described in detail. The second embodiment is provided with a logical channel for the CPU 101 to obtain an operation status, aside from Endpoint2 (306) of the USB host control unit 114, which is used for obtaining an operation status for the external processor 141. In the second embodiment, Endpoint0 (303) shown in FIG. 3 is used as a fifth endpoint for informing the CPU 101 of a status of the recording unit 115.

The Endpoint0 (303) is usually used for bidirectional transmitting of a command. The CPU 101 (host side) issues a command as a device request to a target (the recording unit 115). Accordingly, the recording unit 115 processes the command and returns data to the CPU 101, if needed. The device request is an 8-byte command, which is roughly divided into a command common for all USB devices (Standard Request), a command decided for each device class (Class Request), and a command that can be freely decided by each vendor (Vendor Request).

In the second embodiment, the CPU 101 sends to the recording unit 115 a command requesting for information on an operation status of the recording unit 115 using the vendor request. Accordingly, the recording unit 115 returns information corresponding to this command, so that the CPU 101 obtains an operation status of the recording unit 115.

Now, a process where the multifunction facsimile 100 of the second embodiment according to the present invention performs local recording such as copying, outputting a report, or recording a received image will be described according to a flowchart shown in FIG. 5.

Figure 5:
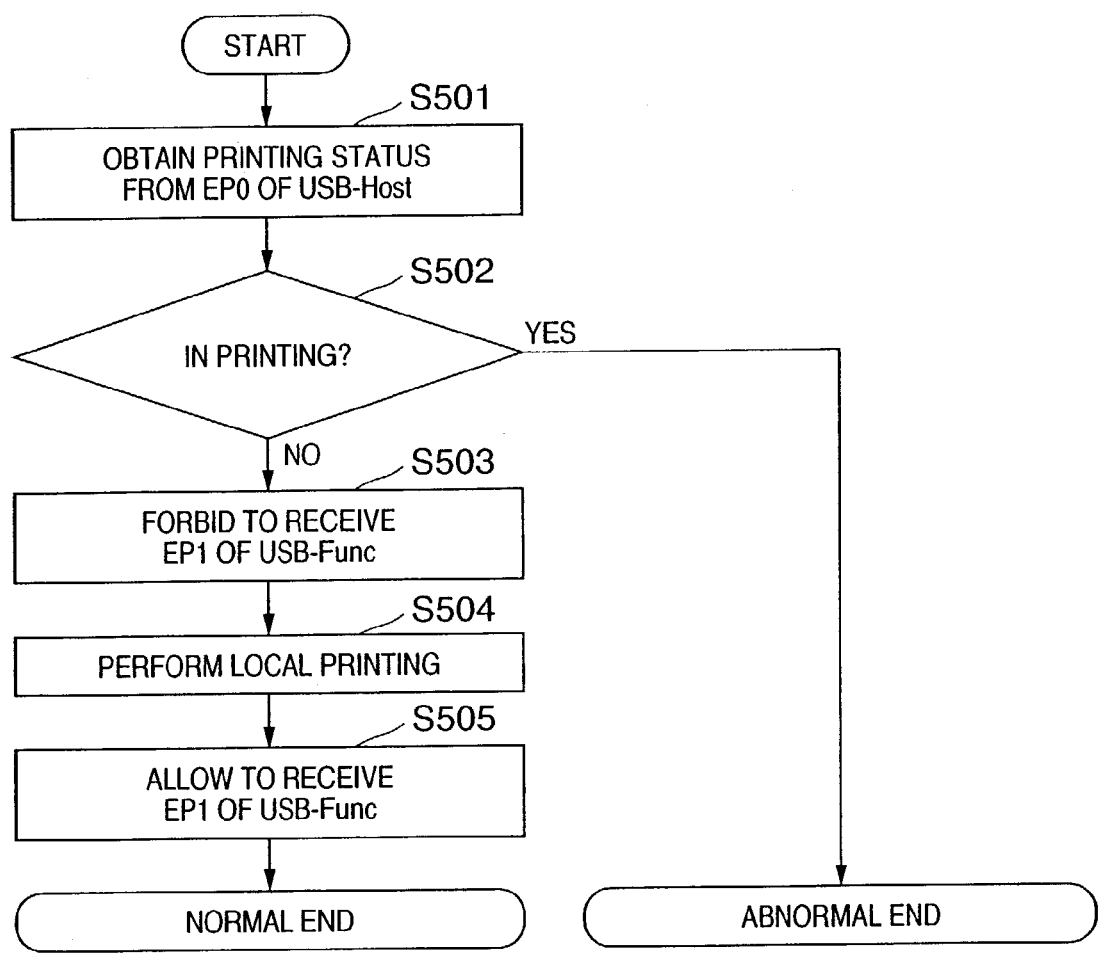
FIG. 5 is a flowchart showing a local recording operation with a multifunction facsimile of a second embodiment according to the present invention.

FIG. 5 is a flowchart for showing a process where recording such as copying, outputting a report, or recording a received image is locally performed in the multifunction facsimile of the second embodiment according to the present invention. A program for performing this process is stored in the ROM 102 and executed under the control of the CPU 101.

When recording starts locally, an operation status of the recording unit 115 is obtained via Endpoint0 (303) of the USB host control unit 114 at step S501 at first. The CPU 101 obtains this operation status information by issuing a command for requiring information on the recording unit 115 using a vendor request via Endpoint0 (303) of the USB host control unit 114 to the recording unit 115 as mentioned above. The recording unit 115 receives this command and sends operation status information to the CPU 101 via Endpoint0 (303).

The process proceeds to step S502, where the received operation status information is searched for to determine whether the recording unit 115 is in the process of printing. As operation status information of the second embodiment is used only between the CPU 101 and the recording unit 115 and not passed onto the external processor 141, an item or format deferent from data sent to the external processor 141 via Endpoint2 (306) can be used as in the above-mentioned first embodiment.

Therefore, the second embodiment limits an item to an operation status for facilitating a search and uses a format of "command: status code", all of which are described in ASCII code, like in the case described in the above-mentioned first embodiment for operation status information. However, all the statuses can be used as in the case where operation status information is passed onto the external processor 141 via Endpoint2 (306), or operation status information can be informed in a binary format.

Operation status information in the second embodiment is "DIS:" for representing an operation status added with a status code. The CPU 101 reads this status code and determines whether the recording unit 115 is in the process of recording (printing).

When it is determined that the recording unit 115 is in the process of printing at step S502, it means that the recording directed by the external processor 141 is performed. Thus, the process abnormally ends without starting local recording.

When it is determined that recording unit 115 is not in the process of printing at step S502, recording starts locally. Initially at step S503, the USB function control unit 113 is set to forbid reception of Endpoint1 (205), which is used for receiving control data and print data from the external processor 141. The USB function control unit 113 has multiple endpoints as shown in FIG. 2, and each endpoint can be independently set for availability of sending and receiving. Each endpoint has a corresponding sending/receiving buffer (not shown); when receiving is allowed, received data is automatically stored into the buffer, while receiving is forbidden, received data is not stored into the buffer, and NAK (negative acknowledge) is returned to a host (CPU 101) at the end of packet transferring. The setting that forbids reception can prevent an instruction of the external processor 141 from reaching the recording unit 115 during a process of local recording.

Next, the process proceeds to step S504, where a local recording process such as copying, outputting a report, or recording a received image is performed. The CPU 101 performs this local recording by transferring control data and print data to the recording unit 115 via Endpoint1 (305) of the USB host control unit 114. When all the recording data has been transferred, the process proceeds to step S505, where the setting that forbids reception of Endpoint1 (205) of the USB function-control unit 113 is reset and the process normally ends.

As mentioned above, according to the second embodiment, when a recording (printing) process is performed by the recording unit 115 in the multifunction facsimile 100, control data and recording data from the external processor 141, such as a computer device, connected via the USB Interface 116 can be forbidden, thus, a conflict between local recording data and recording data from the external processor 141 at the recording unit 115 can be avoided.

Figure 6:
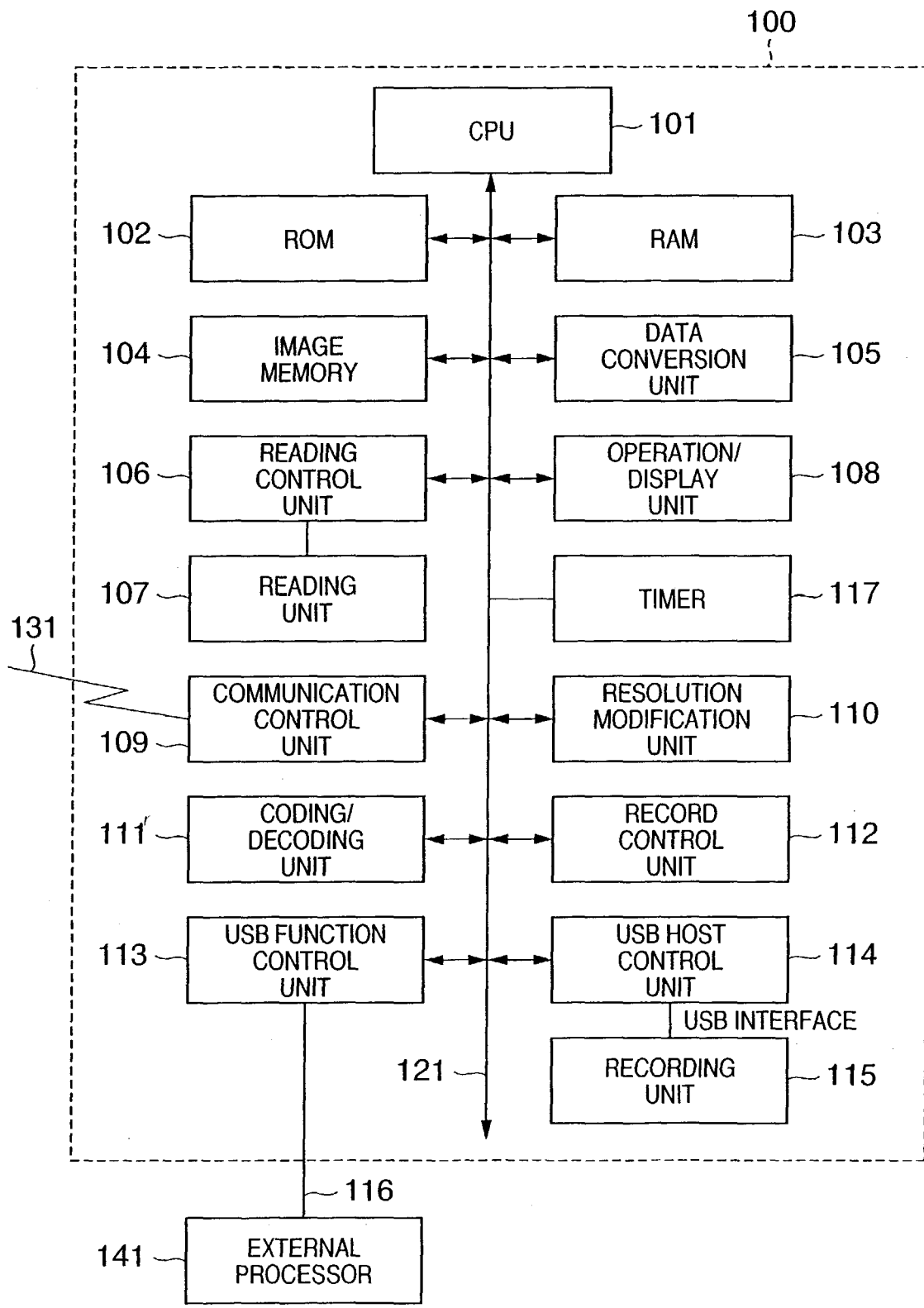
FIG. 6 is a block diagram showing a configuration of the multifunction facsimile of the second embodiment according to the present invention.
Figure 7:
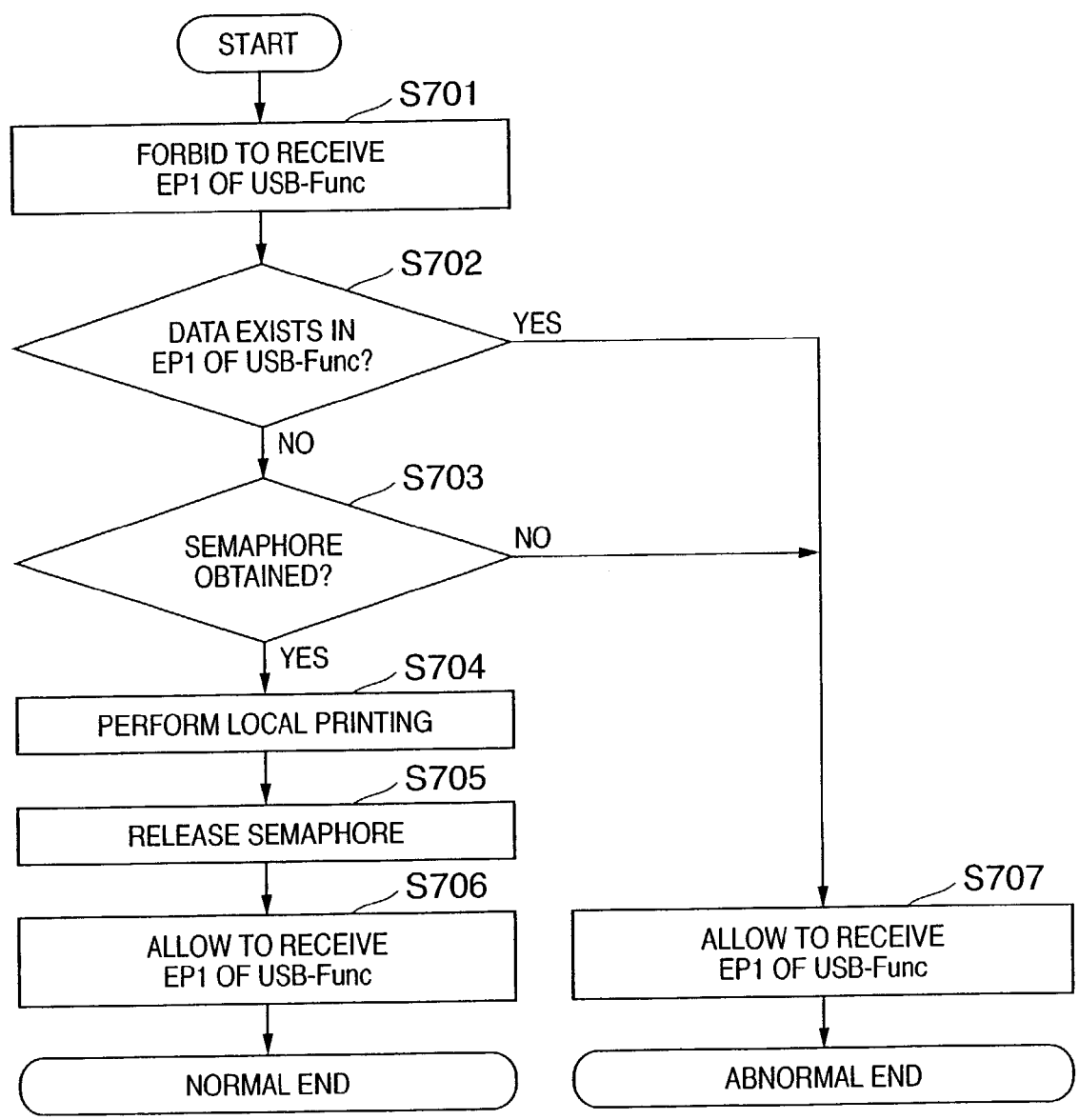
FIG. 7 is a flowchart showing a process for locally recording by copying, outputting a report, recording a received image, etc. at the multifunction facsimile of the second embodiment according to the present invention.

FIG. 6 is a block diagram showing a brief configuration of an example of a print control device, multifunction facsimile 100 of a third embodiment according to the present invention, with the same parts as those in the above-mentioned FIG. 1 are denoted by the same reference numerals and descriptions for them are omitted.

In FIG. 6, reference numeral 117 denotes a timer, which clocks predetermined time according to an instruction from the CPU 101 or generates an interruption to the CPU 101 to inform of elapse when a time period designated by the CPU 101 has passed. In the third embodiment, one-to-one connection is adopted for the USB communication for recording functions as in the above-mentioned embodiment.

Components 101-106, 108-114, and 117 described above are connected each other via the CPU bus 121 under the control of the CPU 101. As the USB interface to the USB function-control unit 113 of the third embodiment is configured in the same manner as that in the above-mentioned embodiment (FIGS. 2 and 3), the description for that is omitted.

Now, a basic operation of the multifunction facsimile 100 of the third embodiment including the above-mentioned configuration will be described.

The facsimile 100 of the third embodiment is connected with the external processor 141 such as a PC via USB (first interface means). The USB function control unit 113, which has multiple interfaces as shown in FIG. 2, is responsible for communication with the external processor 141 in this facsimile 100. Among the multiple interfaces, Interface0 (204) used for the recording unit 115 (printer) is a first logical channel and has Endpoint1 (205) for receiving control data and print data from the external processor 141 and Endpoint2 (206) for sending an operation status from the recording unit 115 to the external processor 141.

The recording unit 115 and the CPU 101 are connected via the USB in the facsimile 100, with the CPU 101 controlling a recording process by the recording unit 115 (second interface means). The USB host control unit 114, which has a single interface (Interface0) as shown in FIG. 3, is responsible for communication with the recording unit 115 in this facsimile 100. Interface0 (304) (second logical channel) has Endpoint1 (305) for receiving control data and print data from the CPU 101 and Endpoint2 (306) for sending an operation status of the recording unit 115.

The CPU 101 in the facsimile 100 transfers control data and print data received from the external processor 141 via Endpoint1 (205) in the USB function control unit 113 to the recording unit 115 via Endpoint1 (305) of the USB host control unit 114. At this moment, no edition is performed on data to be transferred.

In the same manner, the CPU 101 in the facsimile 100 also transfers an operation status from the recording unit 115 received via Endpoint2 (306) in the USB host control unit 114 to the external processor 141 via Endpoint2 (206) of the USB function control unit 113. At this moment, no edition is performed on data to be transferred, either. As data is transmitted in a complete transparent manner here, the external processor 141 can perform printing by controlling the recording unit 115 and be informed on an operation status thereof as if the external processor 141 is directly connected with the recording unit 115.

In the above-mentioned configuration, the CPU 101 needs not analyze recording data from the external processor 141 when the recording unit 115 is printing on the basis of the recording data, thus, processing by the CPU 101 is relieved. Any alteration to the recording unit 115 does not affect an operation of the CPU 101, thus, any type of printers can be selected for the recording unit 115. In the external processor 141, as a basic printer driver can be used as it is, it is advantageous that no effort or load is required for developing or implementing a new driver.

Now, characteristics of the third embodiment will be briefly described before describing the third embodiment in detail.

The third embodiment is characterized by setting a recording semaphore for the recording unit 115. The number of resources (the recording unit 115) is "1". Therefore, when a single application has obtained a recording semaphore, other applications cannot obtain the recording semaphore until the application that obtained the semaphore releases it. This allows exclusive control of the recording unit 115.

In the third embodiment, when a main control unit (CPU 101) locally uses the recording unit 115, for example when it performs a recording operation such as copying, the recording task initially tries to obtain recording semaphore, and records (copies) by using the recording unit 115 only when the semaphore is successfully obtained. It is forbidden to receive recording data from the external processor 141 during a local recording process. Thus, no recording data from the external processor 141 can be inputted into the recording unit 115 during a local recording process. After the local recording ends, the recording task releases the recording semaphore in parallel with permitting reception of recording data from the external processor 141, which allows recording by using the recording unit 115 on the basis of recording data from the external processor 141.

On the other hand, when recording is performed by the external processor 141, a recording semaphore is obtained for recording with recording data from the external processor 141 at the moment of receiving recording data via the USB Interface 116 with the external device (USB function control unit 113). Accordingly, recording data from the external processor 141 starts to be recorded. Thus, during this recording process, a main control unit (CPU 101) makes it impossible to perform local recording. Therefore, an exclusive use of the recording unit 115 becomes available.

After a recording semaphore is obtained at the moment of receiving recording data from the external processor 141, the USB host control unit 114 monitors an operation status of the recording unit 115. When the operation status of the recording unit 115 becomes "being operating" and then returns to "standby", the recording process is considered to end and the recording semaphore is released. When the operation status of the recording unit 115 does not become "being operating" within a predetermined time period after the recording semaphore is obtained, it is determined that the USB host control unit 114 overlooked a status indicating "being operating" due to an insufficient time period of "being operating" and the recording semaphore is released to increase security.

A recording operation of the multifunction facsimile of the third embodiment will be described in detail in conjunction with specific example.

FIG. 4 is a flowchart for showing a process for local recording such as coping, outputting a report, or recording a received image at the multifunction facsimile of the third embodiment according to the present invention. A program for performing the process is stored in the ROM 102 and executed under the control of the CPU 101.

When the facsimile 100 locally starts a recording process, the USB function control unit 113 is set to forbid reception of Endpoint1 (205) to be used for receiving control data and print data from the external processor 141 at step S701 at first. The USB function control unit 113 has multiple endpoints as shown in USB functions in FIG. 2, with each endpoint can be independently set for availability of sending and receiving. Each endpoint has corresponding sending/receiving buffer (not shown); when receiving is allowed, received data is automatically stored into the buffer, while receiving is forbidden, received data is not stored into the buffer, and NAK (negative acknowledge) is returned to a host (here the external processor 141) at the end of packet transferring.

Then the process proceeds to step S702, where a sending/receiving buffer corresponding to Endpoint1 (205) of the USB function control unit 113 is checked. If transferring of data from the external processor 141 has already started when it is set to forbid reception at step S701, data has already stored in the buffer. Then the process proceeds to step S707, where the setting of forbidding to receive Endpoint1 (205) of the USB function control unit 113 is reset, and the process abnormally ends without starting a local recording operation.

On the other hand, when a sending/receiving buffer is determined to be empty at step S702, the process proceeds to step S703, where a recording semaphore is tried to be obtained. The recording semaphore is a resource controlling facility of the recording unit 115 provided by an operating system (OS). An application that requires resources (hardware resources) of the recording unit 115, such as a printer, requires the OS to obtain a recording semaphore corresponding to the resources. Only when the requirement is accepted, the application performs an exclusive process in the recording unit 115 by operating the resources (recording unit). When a recording semaphore is failed to be obtained at step S403, it means that a recording operation on the basis of recording data from the external processor 141 has already started. Then, the process proceeds to step S707, where the setting of forbidding to receive Endpoint1 (205) of the USB function control unit 113 is reset, and the process abnormally ends without starting a local recording operation.

When the recording semaphore is successfully obtained at step S703, the process proceeds to step S704, where a local recording is performed. The CPU 101 performs this local recording by transmitting control data and print data to the recording unit 115 via Endpoint1 (305) of the USB host control unit 114. When all the recording data has been transmitted from the CPU 101, the process proceeds to step S705, where the semaphore is released. Then the process proceeds to step S706, where the setting of forbidding to receive Endpoint1 (205) of the USB function control unit 113 is reset and the process normally ends.

A flow of a control process of local recording has been described.

Figure 8:
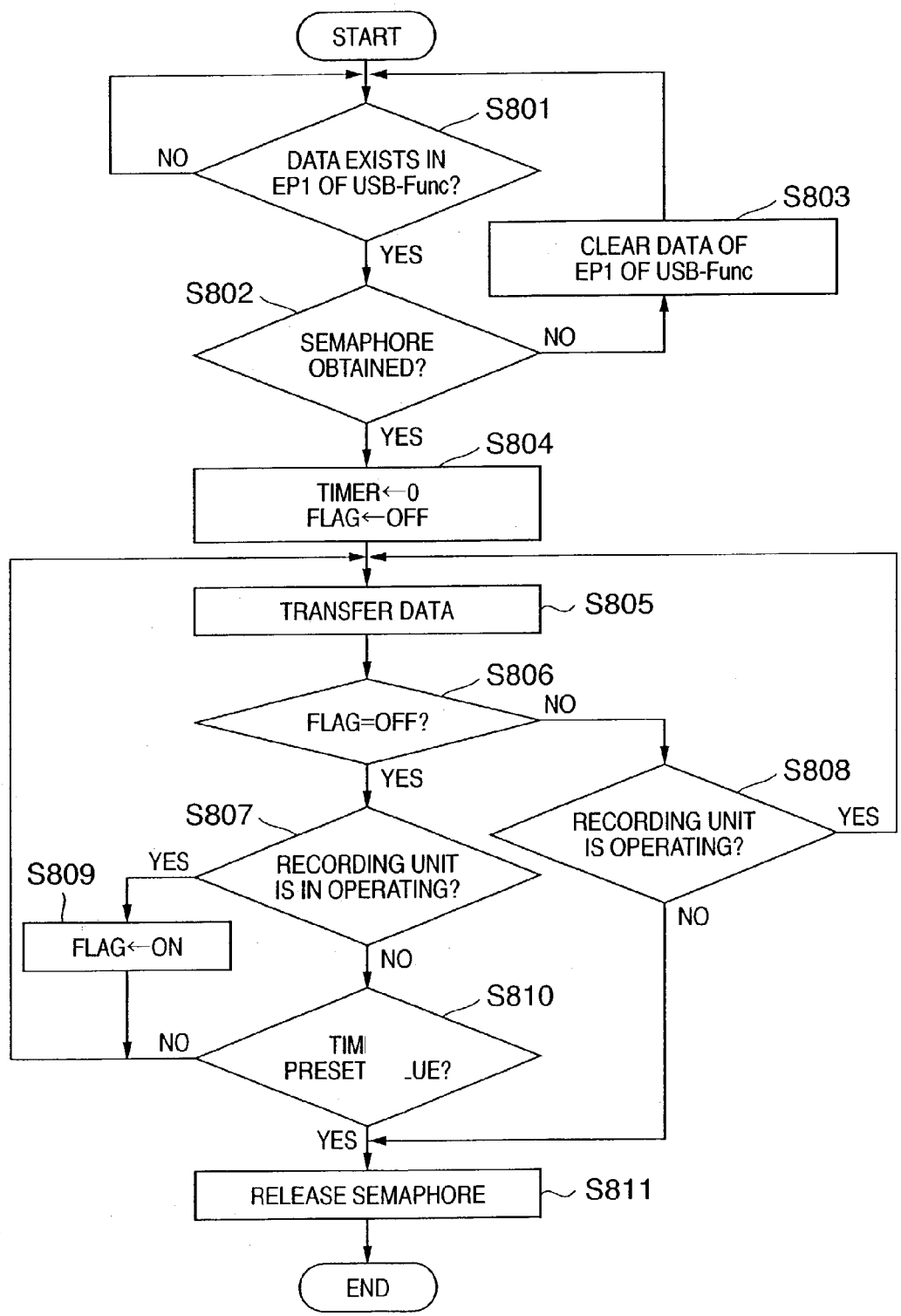
FIG. 8 is a flowchart showing a process for recording on the basis of recorded data from an external processor with the multifunction facsimile of the second embodiment according to the present invention.

FIG. 8 is a flowchart for showing a process when recording is performed on the basis of recording data from the external processor 141 in the multifunction facsimile 100 of the third embodiment according to the present invention. A program for performing the process is stored in the ROM 102, and is executed under the control of the CPU 101.

Initially at step S801, a sending/receiving buffer (not shown) of Endpoint1 (205) of the USB function control unit 113 is checked. When it is determined that data exists in the buffer, it means that transferring of recording data from the external processor 141 has started. Then the process proceeds to step S802. When it is determined that the buffer is empty, it means that transmission of the recording data has not started. Then the process proceeds to step S801. At step S802, a recording semaphore is tried to be obtained. When the recording semaphore is failed to be obtained here, it means that the semaphore is obtained for local recording. Then the process proceeds to step S803, where the receiving buffer is cleared and the contents stored there is discarded. Then the process returns to step S801.

When the recording semaphore is determined to be obtained at step S802, the process proceeds to step S804, where clocking is started with initializing a clock value in timer 117 to "0" and a flag provided to RAM 103 is initialized to off.

Next, the process proceeds to step S805, where the data received via Endpoint1 (205) of the USB function control unit 113 is transmitted via Endpoint1 (305) of the USB host control unit 114 to the recording unit 115. Then check to see whether recording ends or not starts in one of the following steps. At step S806, the above-mentioned flag is checked to see if it is off or not. This flag is initialized to off at step S804 at starting the recording as mentioned above. When the flag is determined to be off at step S806, the process proceeds to step S807, where an operation status of the recording unit 115 is checked.

In the third embodiment, the CPU 101 checks an operation status of the recording unit 115 by reading an operation status of the recording unit 115 via Endpoint2 (306) of the USB host control unit 114. An operation status is obtained in a well-known manner, which is generally performed between a PC and a printer. The manner is summarized as follows: the CPU 101 previously designates an operation status to be return to the recording unit 115. These operating statuses include an operating status, a busy status, a warning status, an operator-call status, and a service-call status. Each piece of status information is represented as "DJS (operation status)", "DBS (busy status)", "DWS (warning status)", "DOC (operator-call status)", and "DSC (service-call status)". A required status among them is sent after a status designation command.

In the third embodiment, a status designation command is SSR. When an operating status "DIS" and a busy status "DBS" are needed, the two commands are connected by a comma and sent as "SSR=DJS,DBS". The recording unit 115 receives this and stores the designated contents and returns the designated status when a status is required hereafter. A format for retuning is "command: status", which are all represented in ASCII code.

The requirement of status is performed by giving In-token to Endpoint2 (306) of the USB of the USB host control unit 114. That is to say, when the CPU 101 wants to know an operation status of the recording unit 115, it obtains the operation status of the recording unit 115 by issuing In-token to the USB host control unit 114, searching for data received from the USB host control unit 114, and extracting a status following a required command. As the CPU 101 wants to know whether the recording unit 115 is operating or not, it can determine whether the recording unit 115 is "operating" or not by reading a status code after, "DJS (operation status)" in a returning format of "command: status".

When a determination at step 807 indicates "being operating", the process proceeds to step S809, where a flag is set on. Then the process returns to step S805. Hereafter, if received data exists in Endpoint1 (205) of the USB function control unit 113, pieces of data is transferred one after another via Endpoint1 (305) of the USB host control unit 114 to the recording unit 115, while checking of the end of recording is repeated. "being operating" of the recording unit 115 means that the recording unit 115 is actually in the process of recording, or in the process of recovering operation and the like, which is a status indicating that the recording unit 115 is processing for all the processes to be performed on received data.

When it is determined that the recording unit 115 is no longer "operating" at step S807, the process proceeds to step S810, where a time clocked by the timer 117 is checked. The timer 117 has been initialized to "0" at step S804 on starting a recording process and clocking has started as mentioned above. When a clock value in the timer 117 exceeds a threshold at step S810, it is determined that the recording data sent from the external processor 141 was invalid or that a status of "being operating" was overlooked due to an insufficient time period of valid operation. Then the process proceeds to step S811, where a recording semaphore is released and the process ends. It is assumed that a threshold is 15 seconds in the third embodiment. When a clock value in the timer 117 is under a threshold at step S810, the process returns to step S805, from which the above-mentioned process is repeated.

When the flag is not off at step S806, it means that the recording unit 115 has started processing the received data. Then the process proceeds to step S808, where an operation status of the recording unit is checked. An operation status of the recording unit 115 is input through Endpoint2 (206) of the USB host control unit 114 and checked as in step S807. When the determination indicates "being operating", it means that a process of the recording unit 115 is in the process. Then the process proceeds to step S805, from which the above-mentioned process is repeated. When determination no longer indicates that an operation status of the recording unit 115 is "being operating" at step S808 at last, it is determined that processing in the recording unit 115 ends. Then the process proceeds to step S810, where the recording semaphore is released and the process ends.

Other Embodiments

Purpose of the present invention is accomplished by providing a recording medium recording a program code of software, which implements functions of the embodiments, to a system or a device as mentioned above and by being read and executed a program code stored in the recording medium with a computer (or CPU or MPU) of the system or the device. In this case, a program code that is read out from a recording medium implements the above-mentioned function of the embodiments, thus, the recording medium storing the program code constitutes the present invention. As a recording medium for providing the program code, for example, a floppy disk, a hard disk, an optical disk, a magneto-optical disk, a CD-ROM, a CD-R, a magnetic tape, a nonvolatile memory card, a ROM, etc. can be used.

In addition to the case where a computer implements the above-mentioned functions of the embodiments by executing a read out program code, the present invention includes the case where an OS (operating system) and the like running on the computer performs a part of or all of the actual processing according to an instruction of the program code, which implements the above-mentioned function of the embodiments.

The present invention also includes the case where a program code read out from a recording medium is written on a memory, which is provided to a function expansion board inserted into a computer or a function expansion unit connected to a computer, and then a CPU or the like, which is provided to the function expansion board or a function expansion unit, performs a part of or all of the actual processing on the basis of an instruction of the program code, whose processing implements the above-mentioned function of the embodiments.

According to the embodiment as mentioned above, an exclusive processing of a recoding operation in the multifunction facsimile can be implemented. Accordingly, the usefulness of a printer of the facsimile is significantly enhanced.

The present invention has a merit of free selection in types of recording unit, because it does not need for a CPU (control unit) to analyze recording data in order to implement an exclusive processing, which does not add any more loads to the processing of the CPU, and the CPU does not depend on language specifications of recording data.

The present invention is effective in that the above-mentioned intentions can be implemented in low cost without needing a new hardware.

An operation status in a recording unit (a printer) is obtained by using the same configuration as that of a basic recording unit in informing an external processor such as a PC of a status. Thus, the present invention is also advantageous in that a recording unit needs not be reformed.

The present invention has another merit of applicability to dynamically changing recording unit, because another configuration is provided to obtain an operation status in a recording unit, which facilitates an analysis of an operation status, and because an item of operation status information to be informed is registered by an external processor such as a PC.

The present invention is not limited to the above embodiments and various changes and modifications can be made within the spirit and scope of the present invention. Therefore, to appraise the public of the scope of the present invention, the following claims are made.

What is claimed is:

1. A recording control apparatus comprising:
   a recording unit configured to record an image;
   a first interface unit including multiple logical channels, and configured to receive recording data from an external processor via a first logical channel of the multiple logical channels;
   a second interface unit configured to connect with said recording unit;
   a buffer configured to store the recording data received by said first interface unit;
   a first obtaining unit configured to obtain a recording semaphore in a case that said buffer stores the recording data from the external processor; and
   a first recording control unit configured to transmit the recording data stored in said buffer to said recording unit via said second interface unit and to cause said recording unit to record based on the recording data, in a case that the recording semaphore is obtained by said first obtaining unit a reading unit configured to optically read an original to output read data; a second obtaining unit configured to obtain the recording semaphore in a case that said buffer does not store the recording data from the external processor; a second recording control unit configured to transmit the read data to said recording unit via said second interface unit and cause said recording unit to record based on the read data, in case that the recording semaphore is obtained by said second obtaining unit, wherein said second recording control unit forbids reception of the recording data from the external processor using said first interface unit before said second recording control unit transmits the recording data through said second interface unit to said recording unit.

2. The apparatus according to claim 1, wherein said first interface unit complies with the USB standards, wherein said first interface unit forms the multiple logical channels by providing multiple interfaces in conformity with the USB standards, and wherein the first logical channel can communicate bi-directionally with multiple endpoints.

3. The apparatus according to claim 1, wherein said second interface unit complies with the USB standards, wherein said second interface unit forms a second logical channel with a single interface in conformity with the USB standards, and wherein the second logical channel can communicate bi-directionally with multiple endpoints.

4. The apparatus according to claim 1, further comprising a determination unit configured to determine an operation status of said recording unit, wherein said first recording control unit releases the recording semaphore, when the operation status determined by said determination unit no longer indicates that said recording unit is in operation.

5. The apparatus according to claim 4, wherein said first recording control unit releases the recording semaphore, when the operation status determined by said determination unit does not indicate that said recording unit is operating even after a predetermined time period has elapsed.

6. An apparatus according to claim 1, wherein said first interface unit transmits the read data to the external processor via a third logical channel of the multiple logical channels.

7. An apparatus according to claim 1, wherein when the recording semaphore is obtained, all other applications are excluded from controlling the recording unit until the recording semaphore is released.

* * * * *